United States Patent
Grawert et al.

(10) Patent No.: US 7,190,524 B2
(45) Date of Patent: Mar. 13, 2007

(54) PROCESS FOR FABRICATION OF HIGH REFLECTORS BY REVERSAL OF LAYER SEQUENCE AND APPLICATION THEREOF

(75) Inventors: Felix Jan Grawert, Cambridge, MA (US); Shoji Akiyama, Annaka (JP); Kazumi Wada, Lexington, MA (US); Franz X. Kaertner, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 25 days.

(21) Appl. No.: 10/917,209

(22) Filed: Aug. 12, 2004

(65) Prior Publication Data

US 2005/0063061 A1    Mar. 24, 2005

Related U.S. Application Data

(60) Provisional application No. 60/494,616, filed on Aug. 12, 2003.

(51) Int. Cl.
  *G02B 1/10* (2006.01)
  *B05D 5/06* (2006.01)
(52) U.S. Cl. ...................... 359/584; 427/166
(58) Field of Classification Search ............... 359/584, 359/586, 587, 588; 427/163.2, 165, 166, 427/167
See application file for complete search history.

(56) References Cited

U.S. PATENT DOCUMENTS

| | | | |
|---|---|---|---|
| 4,826,553 A | 5/1989 | Armitage et al. | |
| 5,216,539 A | 6/1993 | Boher et al. | |
| 5,488,504 A * | 1/1996 | Worchesky et al. | 359/248 |
| 6,130,780 A | 10/2000 | Joannopoulos et al. | |
| 6,142,642 A * | 11/2000 | Krisko et al. | 359/883 |
| 6,286,965 B1 | 9/2001 | Caskey et al. | |
| 2001/0032977 A1 | 10/2001 | Abe et al. | |
| 2002/0060847 A1 | 5/2002 | Joannopoulos et al. | |
| 2002/0089637 A1 | 7/2002 | Lim et al. | |
| 2002/0105000 A1 | 8/2002 | Abe | |

* cited by examiner

*Primary Examiner*—Alessandro Amari
(74) *Attorney, Agent, or Firm*—Gauthier & Connors LLP

(57) ABSTRACT

An optical reflector includes an optical reflective element that comprises alternating layers of high and low index layers. A new substrate is bonded on the optical reflective element. The sequence of layers in the reflective element is reversed in order such that the layers grown first with lowest surface roughness are exposed to the highest electric field strength, and the layer grown last, of highest roughness, are buried deep in the multilayer stack.

11 Claims, 6 Drawing Sheets

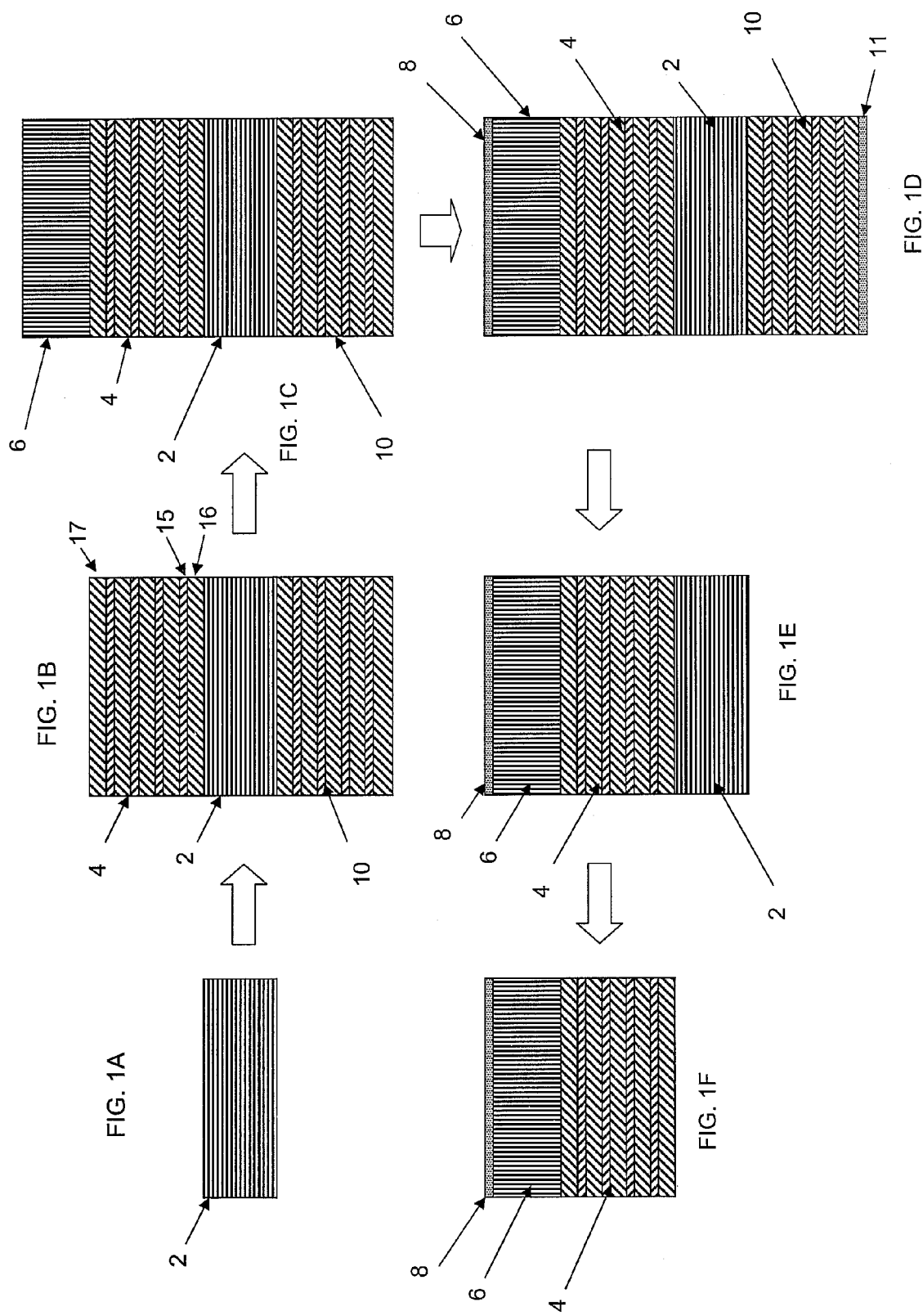

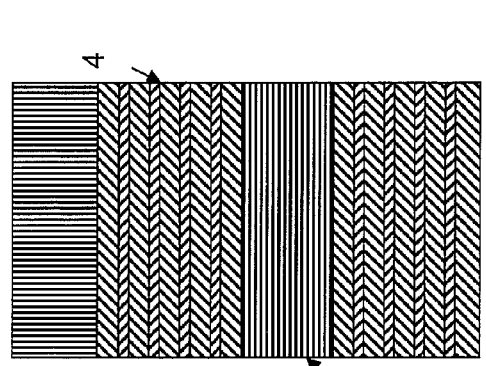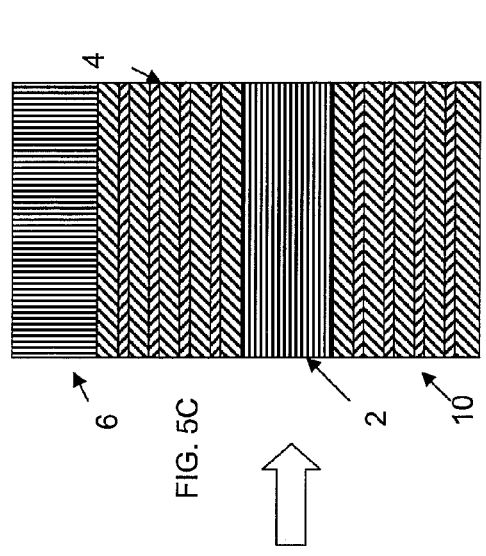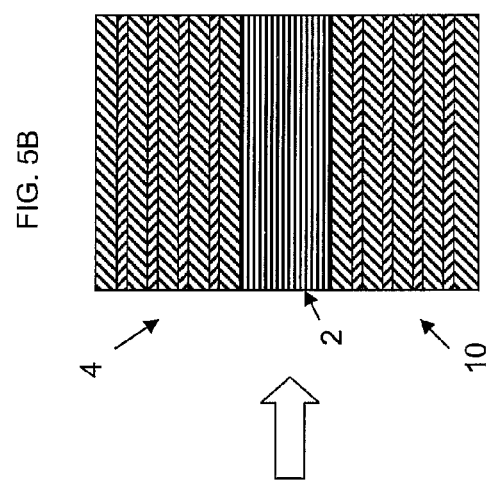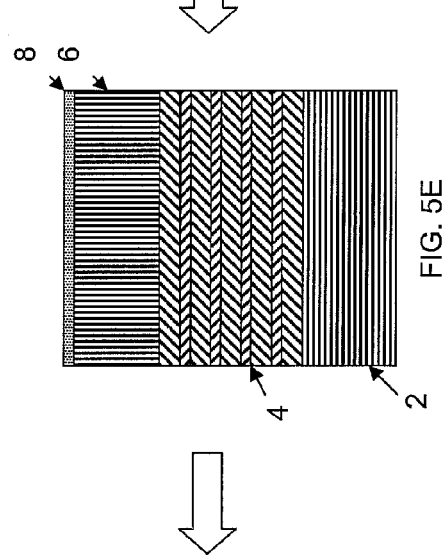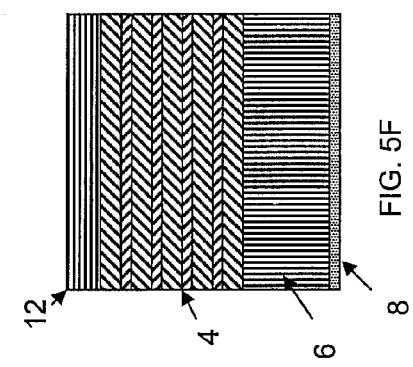

PROCESS FOR FABRICATION OF HIGH REFLECTORS BY REVERSAL OF LAYER SEQUENCE AND APPLICATION THEREOF

PRIORITY INFORMATION

This application claims priority from provisional application Ser. No. 60/494,616 filed Aug. 12, 2003, which is incorporated herein by reference in its entirety.

This invention was made with government support under Grant No. ECS-0119452 awarded by the NSF. The government has certain rights in the invention.

BACKGROUND OF THE INVENTION

The invention relates to the field of optical reflectors, and in particular to fabricating broadband light reflectors and waveguides based on high index contrast materials such as Si/SiO2.

Light reflectors have a broad application spectrum in laser optics and integrated optics. They are part of laser mirrors as well as more elaborate devices such as output couplers, optical filters and dispersion compensators. In integrated optics they can be used for guiding waves in waveguides. The state of the art in producing light reflectors employs either metal reflectors, dielectric Bragg reflectors or semiconductor Bragg reflectors.

Metal reflectors consist of a thin metal layer such as gold, aluminum or silver that is deposited on a glass, semiconductor or similar substrate. They reflect light over a very broad range of wavelengths, but their reflectivity is not very high (e.g., <98%) due to absorption in the metal. In addition, light of different wavelengths undergoes different phase shifts when reflected from the metal, which results in a dispersive reflection. In addition, metal reflectors are not transparent, which prohibits their use in output couplers and beam splitters. When a metal reflector is to be deposited on a semiconductor optical element, for example a saturable absorber, an additional process step beyond the growth of the semiconductor element is required for its deposition. An additional dielectric coating can be employed to enhance the reflectivity of the metal reflector or to protect its surface. This coating can be deposited on top of the metal film. However, for a large number of applications, loss and dispersion restrict the use of metal reflectors.

Dielectric reflectors can be used in many places where reflectivity and dispersion characteristics prohibit the use of metal reflectors. They consist of a coating of dielectric layers of alternating refractive indices, e.g. $SiO_2$ and $TiO_2$, which is deposited on a glass or semiconductor substrate. At each boundary between two adjacent layers a small fraction of the light is partially reflected, such that the coherent superposition of the many partial reflections results in a reflecting element. The partial reflection of light at the layer boundaries is determined by the refractive indices of the two adjacent layers. It is thus a property of the material system selected and largely determines some of the most important properties of the reflector: reflectivity, bandwidth and angle of acceptance. The larger the contrast of refractive indices at each layer boundary, the larger the partial reflection in this place becomes, and as a result, the smaller the number of total layers becomes, that is needed to achieve a certain overall reflectivity.

The commonly used dielectric material system $SiO_2/TiO_2$ (indices n=1.45 and 2.3) has a partial reflectivity of 5% at each index discontinuity, and 11 layer pairs are needed for a 99.8% high reflector. In contrast, a mirror fabricated with $Si/SiO_2$ (indices n=3.5 and 1.45) has a three times larger partial reflection and achieves the same overall reflectivity with only six layer pairs. Furthermore, the index contrast of the layer materials determines the bandwidth of the reflector and the acceptance angle for light to be reflected. Here it is again desirable to have an index contrast as large as possible to achieve a large bandwidth and acceptance angle.

For a given index contrast, the reflectivity can be increased by adding more layers and to a certain extent the bandwidth of the reflector can be extended by a technique called chirping that is well known in the art. The same holds for the design of reflective optical filters such as narrowband reflectors or dispersion compensators, where the properties of the device to be designed can be improved by an increasing number of layers. This problem is comparable to digital filter design, where an increasing number of filter coefficients allows to get closer to a design target. However, limits to this approach of an increasing number of layers are given by fabrication cost, by finite fabrication tolerances and the fact that the layer thicknesses are the more difficult to control during fabrication the thicker the coating becomes. In addition, stress, strain and adhesion of the reflective coating to its substrate limit the maximum coating thickness.

Thus, a larger index contrast of the layer materials allows one to achieve the same performance characteristics with a smaller number of layers or it allows for reflector characteristics that can not be possible with small-index materials. While dielectric reflectors are easily deposited on glass substrates, their deposition on semiconductor materials can lead to problems resulting from stress, low adhesion and mismatch of thermal expansion. In addition, the deposition of dielectric reflectors on semiconductors and semiconductor elements always involves additional process steps in a different deposition machine. This added complexity is very undesirable.

For that reason, in some semiconductor elements such as semiconductor saturable absorbers, reflectors are fabricated out of semiconductor materials. In the class of frequently employed III–V materials, this approach suffers from the problem, that the index contrast of the materials is very small, leading to a narrow bandwidth and narrow acceptance angle and requires a large number of layers to achieve a certain bandwidth.

Furthermore, a large angle of acceptance for the incident light to be reflected is desirable. This property is especially important when the reflector is integrated with other semiconductor devices for example as a substrate in integrated optics or as a backmirror for light emitting devices or solar cells.

Omnidirectional reflectors, i.e., reflectors that reflect light incident from all possible directions and at all polarizations, have been demonstrated recently. If the index contrast of the reflector is high enough, and if the low-index layer has an index that is higher by about a factor of 1.5 from that of the incident medium, a reflector becomes omnidirectional for a certain wavelength range. These conditions are satisfied for a Si/SiO2 mirror with air as the incident medium over a bandwidth of approximately 25% of the center wavelength. For SiO2 as incident medium (n=1.45) and SiN, Ta5O4, Ti (n=2.0 . . . 2.2) as low-index layer and Si (n=3.5) as high index layer there is a very small wavelength region around the center wavelength of the reflector, where it is omnidirectional. Such a reflector based on the $Si/SiO_2$ material system has been used in the prior art. Alternating layers of high refractive index (Si) and low refractive index ($SiO_2$) are deposited on top of a silicon substrate.

If the Si and $SiO_2$ layers are deposited on top of the wafer layer by layer either by CVD processes or sputtering or a similar deposition process, imperfections in the surface quality accumulate such that the topmost layer has a significantly roughened surface. The surface roughness increases, the more layers are deposited. Thus, it is highest at the top of the deposited multilayer stack. Here, close to the surface of the mirror. Since it is at the position of this layer that the strength of the electric field is highest, and thus, the accumulated surface roughness has the largest impact. It leads to significant scattering loss, especially in the short-wavelength range of the stop band of the mirror. This problem is especially pronounced in $Si/SiO_2$ and similar high index contrast material systems. Due to the scattering loss the application of mirrors produced according to this process is limited to applications where higher loss can be tolerated. In contrast, in more narrowband dielectric multi-layer stacks this problem does usually not arise.

If, in contrast, the layers are not deposited by CVD processes but added on top of each other by wafer bonding, high quality surfaces are present throughout the device. Thus, scattering losses will be minimal. However, due to the large number bonding steps or repeated application of smart-cut processes the fabrication process has a significantly reduced yield. The wafers have to be processed one by one, and in each bonding step a certain number of wafers break or turn out to be useless. This process has been demonstrated in prior art.

SUMMARY OF THE INVENTION

According to one aspect of the invention, there is provided an optical reflector. The optical reflector includes an optical reflective element that comprises alternating layers of high and low index layers. A new substrate is bonded on the optical reflective element. The sequence of layers in the reflective element is reversed in order such that the layers grown first with lowest surface roughness are exposed to the highest electric field strength, and the layer grown last, of highest roughness, are buried deep in the multilayer stack.

According to another aspect of the invention, there is provided a method of forming an optical reflector. The method includes providing a first semiconductor substrate and forming on the substrate optical reflective elements that are comprised of alternating layer of high and low index layers. Also, the method includes removing the first semiconductor substrate. Furthermore, the method includes reversing the order of the layers in the multilayer stack.

According to another aspect of the invention, there is provided a method of forming an optical reflector. The method includes providing a first semiconductor substrate and forming on the substrate optical reflective elements that are comprised of alternating layer of high and low index layers. Also, the method includes removing a portion of the first semiconductor substrate. Furthermore, the method includes reversing the order of the layers in the multilayer stack.

According to yet another aspect of the invention, there is provided an optical device. The optical device includes an optical reflective element that comprises alternating layers of high and low index layers. A new substrate is bonded on the optical reflective element. The sequence of layers in the reflective element is reversed in order such that the layers grown first with lowest surface roughness are exposed to the highest electric field strength, and the layer grown last, of highest roughness, are buried deep in the multilayer stack.

BRIEF DESCRIPTION OF THE DRAWINGS

FIGS. 1A–1G are schematic diagrams illustrating one embodiment of the proposed fabrication process in accordance with the invention;

FIGS. 5A–5F are schematic diagrams illustrating another embodiment of the proposed fabrication process to the production of devices.

DETAILED DESCRIPTION OF THE INVENTION

Figure 1G:
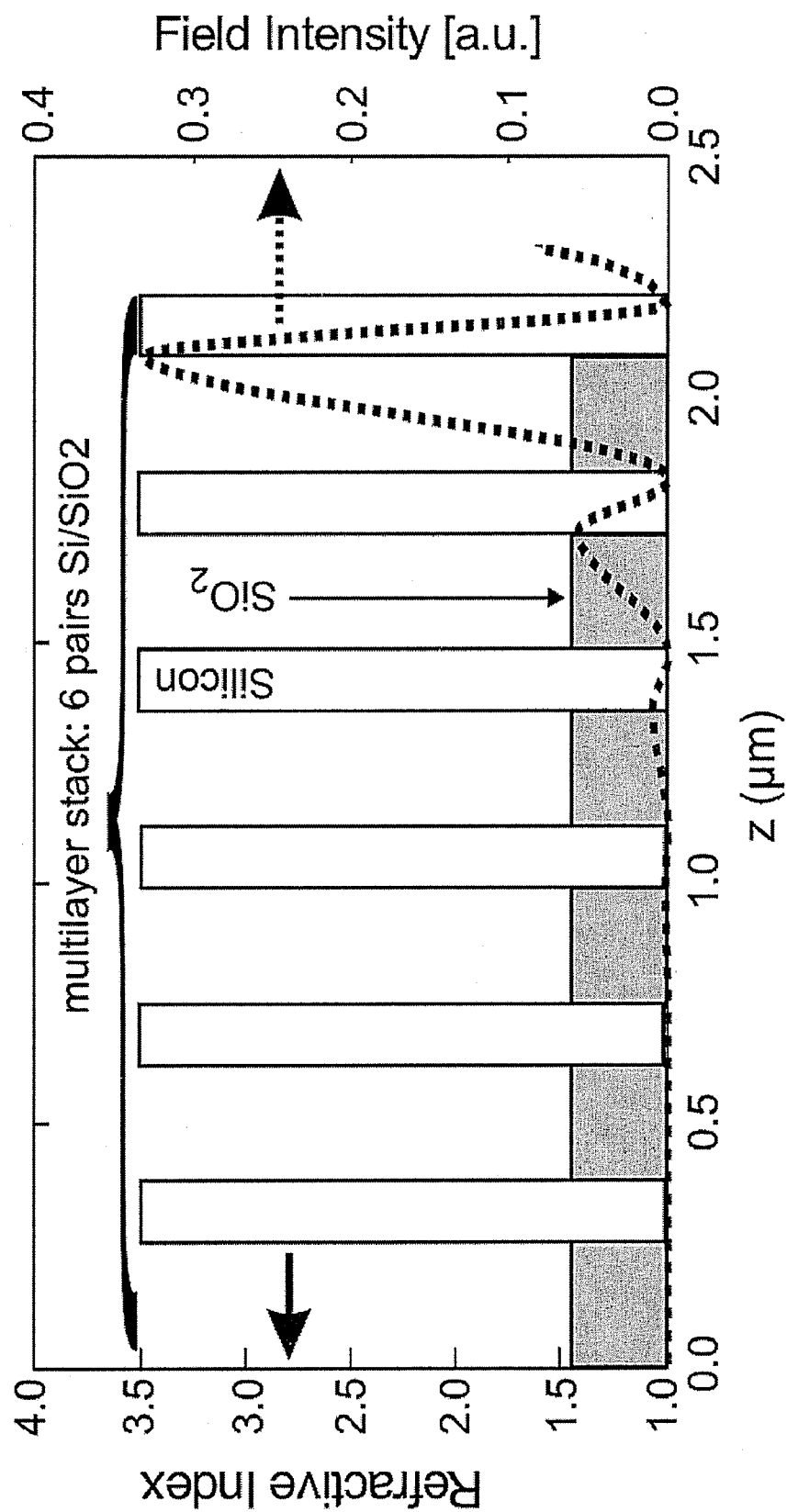

The invention includes a process to fabricate reflective devices and devices containing reflectors with a contrast of the refractive indices of the layer materials of $n_2/n_1 > 1.4$. Specifically, it applies to high index contrast materials such as Si/SiO2 or Si/SiO2/SiN but also to other material systems, in which scattering losses constitute limits to device performance. The fabricated devices are reflectors for electromagnetic waves in the UV, visible and IR range and the microwave region. The new process allows for fabrication of these devices based on standard silicon manufacturing processes at a high fabrication yield with very low scattering loss. The results are reflectors that exhibit a flat reflection profile over their entire bandwidth. The reflectors achieve a very high reflectivity with a small number of layers, have a large bandwidth and have a large acceptance angle for incident light. The layer materials can be chosen such that an omnidirectional reflector, i.e., a reflector that reflects light from all angles of incidence in all polarizations, is created. The proposed fabrication process allows for an easy integration of the reflector with other device functionality on the same wafer.

FIGS. 1A–1F shows a process flow diagram of the fabrication of the reflective device. Starting from a crystalline substrate 2, either a silicon wafer, a quartz wafer, a germanium wafer or an SOI or similar wafer, the multilayer stacks 4, 10 are deposited layer by layer, as shown in FIG. 1A. For simplicity of fabrication, accurate control of the layer 4 thicknesses and quality of the layer 4 interfaces, a CVD (Chemical Vapor Deposition) or PVD (physical vapor deposition) process is chosen for deposition of the high-index layers 15, e.g., Si layers. Alternative deposition methods can be employed for this process, as shown in FIG. 1B. The low-index layers 16, e.g. $SiO_2$, can either be deposited by CVD, Flame Hydrolysis or be created by thermal oxidation. A dry oxidation procedure was selected in the example discussed since it allows for a precise control of the resulting SiO2 layer thicknesses and since it produces smoother interfaces between the $SiO_2$ and Si layers than a deposition process would yield. The deposition processes mentioned, namely CVD and thermal oxidation, result in deposition of the layer sequence on both sides of the wafer forming layer stacks 4, 10. Other deposition methods such as PVD can result in deposition of the multilayer stack 4 on only one side of the wafer. In this case, the bottom layer stack 10 will not be formed. However, formation of the bottom multilayer stack is a mere byproduct of the deposition process, and both classes of methods (CVD, PVD) are equivalent with respect to the invention, since only the top mirror 4 is part of the eventual device. In processes that result in deposition on both sides, the bottom mirror 10 is removed later in a further process shown in FIGS. 1D–1E.

After deposition of the desired layer sequence, a new substrate 6 is bonded on top of the layer stack 4 as shown in FIG. 1C. This substrate 6 can be a Silicon wafer, a Germanium wafer or a quartz wafer or a wafer of different material that suits the application. For the last layer 17 of the layer stack 4 a material will be chosen that allows for a strong and reliable bond formation at the interface. For example, if a silicon wafer is to be taken as the new substrate, the layer stack 4 will be terminated with a layer 17 that easily bonds to Silicon. Furthermore, before wafer bonding, this last layer 17 of the layer stack 4 is planarized with a polishing step such a CMP to create a smooth surface.

Thus, this last layer 17 of the layer stack 4 can be deposited at a greater thickness than needed eventually after CMP polish. Since the thickness of the material removed during the CMP step can not be controlled very well, in many applications where only the reflective properties of the device are important, it can be beneficial to create this last layer free of optical functionality. In this case, the thickness of this layer 17 and its material can be selected entirely to optimize the bond formation, regardless of its optical properties. Thus, even layers of third materials not suitable for optical purposes, e.g. with high absorption, can be employed in this layer 17.

In a subsequent step, the original substrate 2 is removed. Various methods, all well know in the art, are available for this step. The entire wafer, as shown in FIG. 1D, can be coated with a protective layer 8 and 11 on both sides, for example SiN, that is then removed by lapping or chemomechanical polishing (CMP) on one side, as shown in FIG. 1E. Then, the original substrate 2 is removed by an omnidirectional etch, as shown in FIG. 1F. If the deposition process of the multilayer stack 4 forms a bottom reflector 10 as a byproduct, the latter is removed in this process as well.

Another method is to protect only one side of the wafer (e.g., with layer 8, and by not having a layer 11), such that no lapping step is necessary to remove protection 11 on the other side. For example, in a wet etch process, a wafer holder might be used that protects one side of the wafer from contact with the acid. Alternatively, a protective coating such as a photoresist may be deposited only one side of the wafer. Yet another method to ensure removal of the substrate 2 from only one side is to use a unidirectional etch process such as reactive ion etching (RIE). All processes used for removal of the substrate have in common, that they offer a high etch selectivity between the material of the original substrate 2 and the material of the adjacent layer. Dedicated etch stop layers of third materials may be inserted. Protective layers 8 and 11 may be used if the etch threatens to attach both sides of the wafer. All these processes are well known in the art, and the specific choice of process is not relevant to the invention.

The result of the proposed process is a high reflector on top of a new substrate that has been attached to the reflector by wafer bonding. Since the original substrate was removed, the sequence of layers in the resulting device is revered. The layers of the reflector that were grown first in the deposition process have the best surface quality, since surface roughness accumulates gradually. Due to substrate removal and reversal of the layer stack, these high quality layers are closest to the top surface of the reflector. In contrast, the roughest layers, grown last in the fabrication process, end up buried deep in the mirror, where the electric field intensity is very low, as shown in FIG. 1G. Here, both the refractive index profile of the mirror (solid line) and the distribution of field intensity (dashed line) are depicted. The electric field is incident from air to the right of the reflector. Its intensity is very high in the top layers of the mirror, but vanishes quickly upon penetration into the multilayer stack. Thus, a high surface roughness in the layers close to the top of the mirror, can result in large scattering losses. In contract, by reversing the sequence of the multilayer stack, and thus by burying the roughest layers deep in the mirror (to the left in FIG. 1G) the scattering losses can be reduced to a minimum, since they are barely reached by the electric field.

As a result of the reversal of the layer sequence, scattering losses are reduced significantly. This improvement is significant especially in the range of shorter wavelengths and allows producing high reflectors with reflectivities $R>99.5\%$ over the entire wavelength range that is determined by the index contrast of the materials employed and the layer thicknesses selected. This process allows to produce high reflectors that highly reflect simultaneously at both telecom wavelengths 1.3 μm and 1.5 μm and that can be monolithically integrated with other semiconductor elements by standard process technology.

Figure 2:
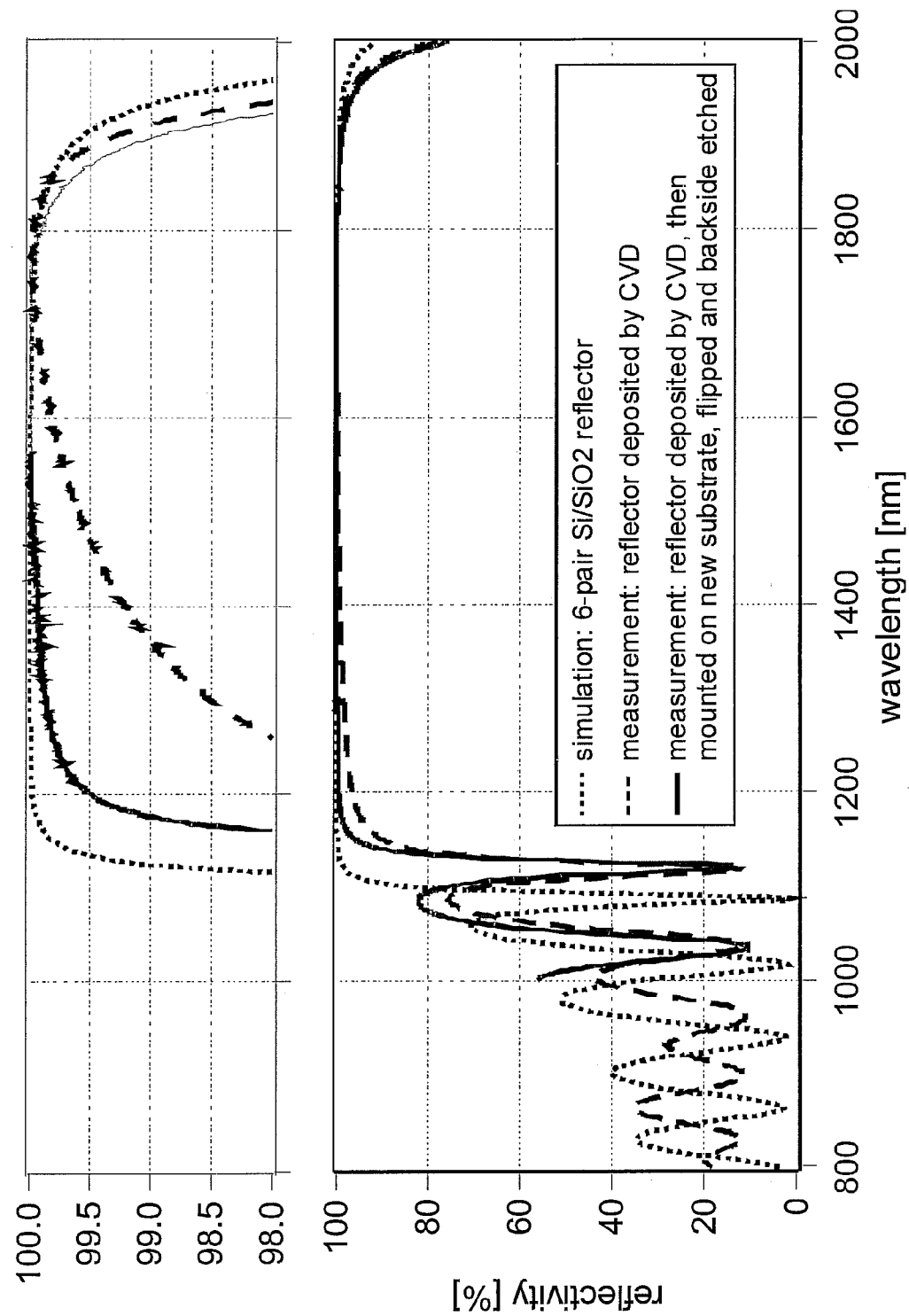
FIG. 2 is a graph illustrating the calculated and measured reflectivity of $Si/SiO_2$ reflectors with 6 layer pairs produced with two different fabrication methods.

A measured result of a fabrication of a six-pair high reflector is shown in FIG. 2. The dotted curve shows the simulated reflectivity of the reflector under the assuming no scattering losses or fabrication tolerances. The mirror fabricated by a mere deposition of the layers shows a significant deviation of the reflectivity from the simulated result due to high scattering losses close to the mirror surface (dashed line). In contrast, the mirror fabricated according to the proposed fabrication process (solid line) shows almost no scattering losses and comes close to the bandwidth expected from the simulation. The reversal of the layer stack has placed the highest quality layers closest to the surface with the desired result.

Figure 3:
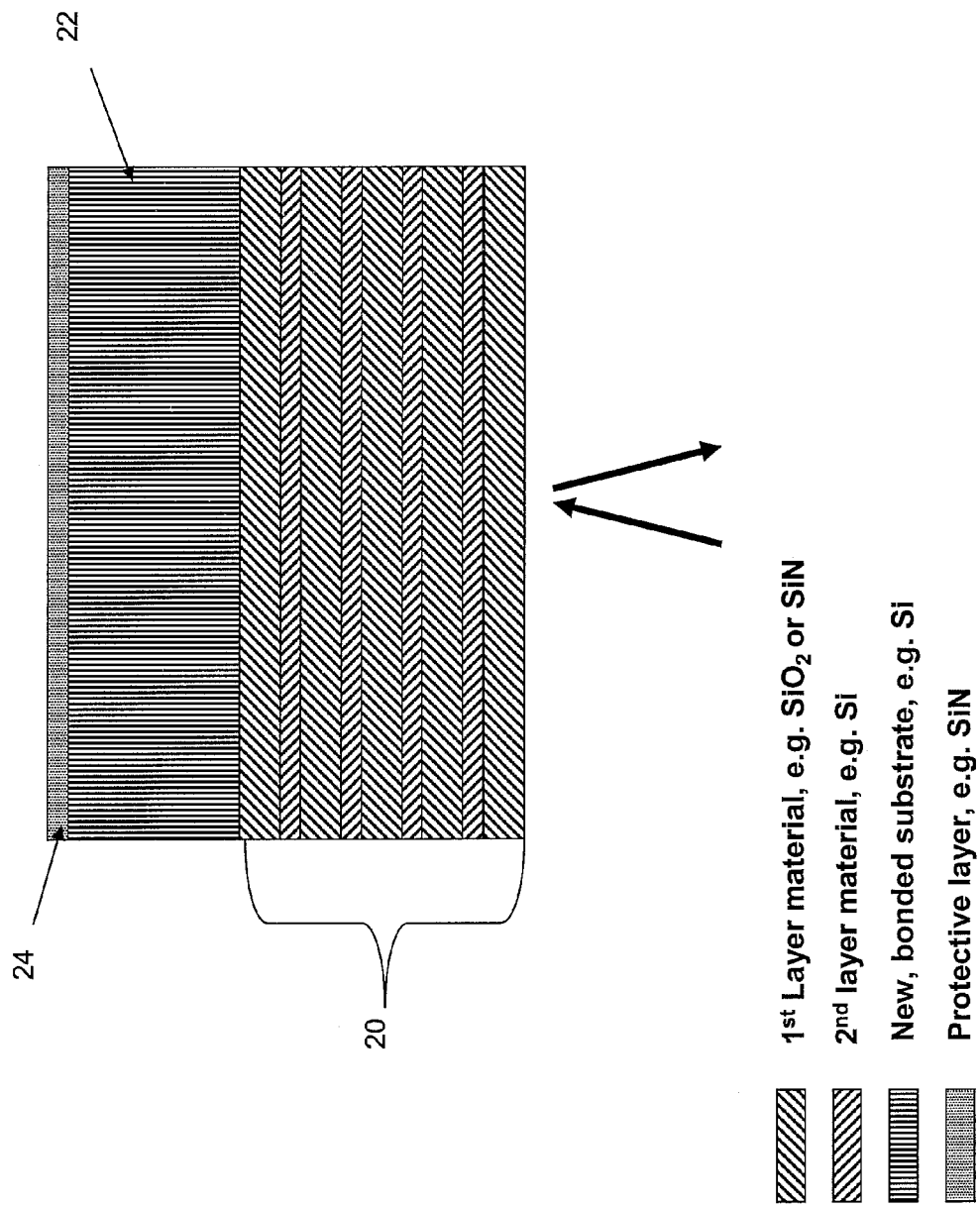
FIG. 3 is a schematic diagram illustrating an exemplary application of the invention to a high reflector.

This invention is useful in applications that require high reflectors in the infrared or near infrared part of the optical spectrum that have a very high reflectivity ($R>99.5\%$) over a very large bandwidth. As shown in FIG. 3, this embodiment of the invention results directly from the fabrication process mentioned above and depicted in FIGS. 1A–1F: A number of alternating high and low index layers 20 forms the high reflector and is mounted on the new, wafer bonded substrate 22. Note the protective layer 24 is formed on the substrate 22. Without application of further techniques, such as chirping, this reflector achieves the high reflectivity over a very large bandwidth due to the high index contrast inherent in the material system and due to the avoidance of scattering losses by the flipping scheme of the fabrication process. A measured result of the reflectivity of such a mirror with six $Si/SiO_2$ pairs on a Si substrate is shown in FIG. 2.

Furthermore, the high index contrast makes the reflector omnidirectional, if certain conditions for the ratio of the refractive indices of both layer materials and the incident medium hold. For example, if the light is incident from air and the $Si/SiO_2$ material system is used, over a bandwidth of approximately 25% of the center wavelength all light is reflected regardless of polarization and angle of incidence, as shown in FIG. 3.

Figure 4:
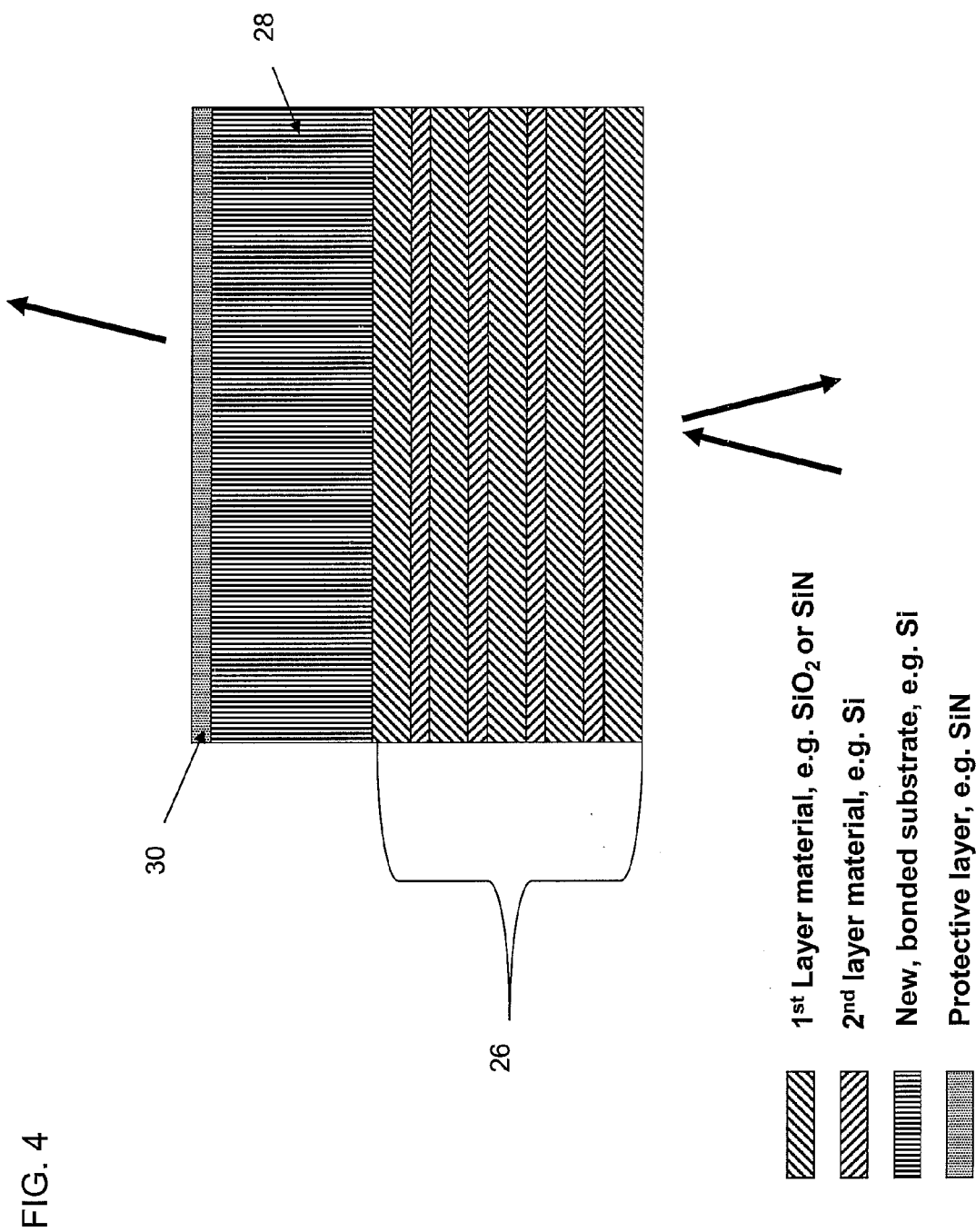
FIG. 4 is a schematic diagram illustrating an exemplary application of the invention to a partially transparent device such as an output coupler or a beam splitter.

If a transparent material such as quartz is chosen for the new, bonded substrate, the invention allows for fabrication of partially transparent reflectors such as broadband output couplers and low-loss, low-dispersive beam splitters, as shown in FIG. 4. For this purpose, the layer stack 26 is designed not to reflect as much light as possible by a using large number of layers, but instead only a smaller fraction of the incident light by reducing the number of layers.

The main benefit of this embodiment of the invention is that a large bandwidth of almost constant reflection/transmission can be achieved over which the device shows a minimum amount of group delay dispersion. This is due to the fact that the large bandwidth is not achieved by a chirped layer structure but instead using high index contrast layer materials. Material dispersion from the new, bonded substrate 28 can be further reduced by use of ultra-thin substrates with low material dispersion. For example, after bonding the new substrate 28 on top of the layer stack 26, its thickness can be reduced in an additional polishing step. Note the protective layer 30 is formed on the substrate 22.

Beyond the fabrication of broadband high reflectors, the high index contrast can be exploited to fabricate Fabry-Perot and Gires-Tournois type optical filters, dispersion compensators such as chirped mirrors and resonators.

The present invention can be employed to produce a novel type of substrate for use in integrated optics. As depicted in FIGS. 5A–5F, the process flow allows for fabrication of high reflectors on top of a semiconductor substrate such as Silicon, Germanium, SOI or similar. The fabrication process is identical to that discussed in FIGS. 1A–1F except for the last process step shown in FIG. 5F: The original substrate 2 is not completely removed by polishing or etching, thus forming a layer 12. Instead it is either completely or partially left in place. For example, if the original substrate 2 is a silicon wafer, part of it can be cut away by a smart cut or similar process, and possibly a subsequent polishing step, while a certain part of it is left in place, as shown in FIG. 5F. If the original substrate 2 is a SOI wafer, the Silicon handle and the buried oxide can be removed by polishing and selective etching while the SOI layer is left in place for device use.

Similar to the fabrication of the high reflectors mentioned earlier, the highest quality layer of the reflector is placed in positions of highest electric field strength. Thus, the proposed fabrication scheme results in high optical reflectance and minimization of scattering losses. This reduction of scattering losses is of great importance in this application of the high-index contrast layer stack: Unlike the use in high reflectors, in this application light is no longer incident close to normal to the layer structure. Instead it propagates almost parallel to the layer structure. As a result, rough layer interfaces lead to large scattering losses. This problem is overcome with the proposed fabrication scheme.

Furthermore, after processing the device layer, e.g., forming waveguides, filters, resonators, switches etc, an identical reflector can be added on top of it such that light is vertically confined in the device layer by the two reflectors. This top reflector can be grown directly on top of the device layer. This can be suitable if the device layer provides a planarized surface. Alternatively, a reflector produced by the proposed fabrication process of FIGS. 1A–1F can be bonded on top of the device layer.

The benefit of this fabrication scheme for producing reflective substrates in integrated optics is fourfold. First of all, the reflector exhibits very low optical loss. Second, it can be used as a photonic device platform, that conducts heat from the active layer much better than a conventional thick SiO2 buffer layer, because the overall thickness of the Bragg mirror is much less than the thickness of the buffer layer. Thus in total the thickness of the SiO2 involved can be reduced from 2 μm to 0.5 μm leading to a factor of four higher thermal conductivity. Furthermore, other material systems could be employed that even better conduct heat than Si/SiO2. Third, the materials could be chosen to be electrically conductive, while high reflectivity, low scattering losses and low fabrication cost are preserved. Fourth, the use of two multilayer high reflectors for confinement and guiding of light allows for a much larger set of angles of incidence and thus optical modes to be guided in the structure than traditional waveguides by total internal reflection.

Among other benefits, this significantly facilitates coupling from optical fibers into the device, and facilitates mode matching between different functional sections on the chip. For a narrow wavelength range and a careful choice of materials (e.g. refractive indices 1.5, 2.2 and 3.5 for device layer, low-index reflector layer and high-index reflector layer), the reflector can even be made omnidirectional. Key to the feasibility of this structure is again the fabrication of a low-loss high-reflector with standard silicon batch processing technologies at high yield.

The invention can be employed to yield a crystalline top layer on top of a low-loss high reflector. The resulting structure can further be used to produce loss modulators, semiconductor saturable absorbers and other nonlinear optical devices.

Although the present invention has been shown and described with respect to several preferred embodiments thereof, various changes, omissions and additions to the form and detail thereof, can be made therein, without departing from the spirit and scope of the invention.

What is claimed is:

1. An optical reflector comprising:
   an optical reflective element that includes alternating layers of high and low index layers are formed on a first semiconductor substrate; and
   a new substrate that is bonded on said optical reflective element, wherein
   the sequence of layers in the reflective element is reversed in order such that the layers grown first with lowest surface roughness are exposed to the highest electric field strength, and the layer grown last, of highest roughness, is buried deep in the multilayer stack, and said first semiconductor substrate that is adjacent to the first layer of lowest surface roughness is removed.

2. The optical reflector of claim 1, wherein said high index layers comprise of Si, doped Si, Si-compounds such as Si(x)Ge(1−x), Ge, or other heat or electrically conductive materials.

3. The optical reflector of claim 1, wherein said low index layers comprise of SiO2, Si(x)O(y), SiN, ITO, or other heat or electrically conductive materials.

4. The optical reflector of claim 1 further comprising a protective layer that comprises SiN.

5. The method of claim 1, wherein said high index layers comprise of Si, doped Si, Si-compounds such as Si(x)Ge(1−x), Ge, or other heat or electrically conductive materials.

6. An optical device comprising:
   an optical reflective element that includes alternating layers of high and low index layers formed on a first semiconductor substrate; and
   a new substrate that is bonded on said optical reflective element, wherein
   the sequence of layers in the reflective element is reversed in order such that the layers grown first with lowest surface roughness are exposed to the highest electric field strength, and the layer grown last, of highest roughness, is buried deep in the multilayer stack, and said first semiconductor substrate that is adjacent to the first layer of lowest surface roughness is removed.

7. The optical reflector of claim 6, wherein said high index layers comprise of Si, doped Si, Si-compounds such as Si(x)Ge(1−x), Ge, or other heat or electrically conductive materials.

8. The optical reflector of claim 6, wherein said low index layers comprise of SiO2, Si(x)O(y), SiN, ITO, or other heat or electrically conductive materials.

9. The optical reflector of claim 6 further comprising a protective layer that comprises SiN.

10. The optical device of claim 6, wherein said device is configured to be an optical beam splitter.

11. The optical device of claim 6, wherein said device is configured to be an output coupler.

* * * * *